United States Patent
Degen et al.

(10) Patent No.: US 12,429,838 B2
(45) Date of Patent: Sep. 30, 2025

(54) BUILDING AUTOMATION SYSTEM AND METHOD FOR MANAGING CAUSAL CHAIN FOR FAULT DETECTION AND DIAGNOSTICS

(71) Applicant: Siemens Industry, Inc., Alpharetta, GA (US)

(72) Inventors: Heinrich Helmut Degen, Plainsboro, NJ (US); Christof J. Budnik, Hamilton, NJ (US); Gregory Conte, Gulf Breeze, FL (US); Andrew Lintereur, Austin, TX (US); Seth Weber, Dover, PA (US)

(73) Assignee: Siemens Industry, Inc., Alpharetta, GA (US)

( * ) Notice: Subject to any disclaimer, the term of this patent is extended or adjusted under 35 U.S.C. 154(b) by 479 days.

(21) Appl. No.: 17/840,129

(22) Filed: Jun. 14, 2022

(65) Prior Publication Data
US 2023/0400827 A1    Dec. 14, 2023

(51) Int. Cl.
*G05B 19/042*    (2006.01)
*G05B 23/02*    (2006.01)

(52) U.S. Cl.
CPC ....... *G05B 19/042* (2013.01); *G05B 23/0275* (2013.01); *G05B 2219/25011* (2013.01)

(58) Field of Classification Search
CPC .............. G05B 19/042; G05B 23/0275; G05B 2219/25011; G05B 19/05; G05B 2219/24048; G05B 2219/24086; G05B 15/02; G05B 2219/2642
See application file for complete search history.

(56) References Cited

U.S. PATENT DOCUMENTS

| | | | | |
|---|---|---|---|---|
| 11,017,321 | B1* | 5/2021 | Mishra | G05B 23/0283 |
| 2002/0019870 | A1* | 2/2002 | Chirashnya | H04L 41/142 |
| | | | | 709/224 |
| 2004/0034456 | A1* | 2/2004 | Felke | B64F 5/60 |
| | | | | 701/32.9 |
| 2005/0043922 | A1* | 2/2005 | Weidl | G06N 7/01 |
| | | | | 702/183 |
| 2011/0137853 | A1* | 6/2011 | Mackay | G06Q 10/06 |
| | | | | 706/57 |

(Continued)

FOREIGN PATENT DOCUMENTS

| | | |
|---|---|---|
| CN | 103197168 B | 8/2015 |
| EP | 3633511 A1 | 4/2020 |

OTHER PUBLICATIONS

Degen Helmut et al: "How to Explain It to Energy Engineers?", Nov. 25, 2022 (Nov. 25, 2022), Nov. 25, 2022, pp. 262-284, XP047640682, https://doi.org/10.1007/978-3-031-21707-4_20.

(Continued)

*Primary Examiner* — Kamini S Shah
*Assistant Examiner* — Jonathan Michael Skrzycki

(57) ABSTRACT

There is disclosed a building automation system, and a method thereof, for managing causal chain. Facility data of the building automation system is collected. One or more suggested causes and one or more causal chains are generated based on the facility data. One or more responsive actions are determined based on the suggested cause or causes, the causal chain or chains, and a cause-action mapping. A particular causal chain is provided based on the at least one responsive action and manager information.

24 Claims, 20 Drawing Sheets

(56) References Cited

U.S. PATENT DOCUMENTS

| | | | | |
|---|---|---|---|---|
| 2011/0145180 A1* | 6/2011 | Muller | ............... | G05B 19/042 |
| | | | | 706/23 |
| 2017/0213303 A1 | 7/2017 | Papadopoulos et al. | | |
| 2019/0025809 A1* | 1/2019 | Bhattacharya | ......... | G05B 15/02 |
| 2019/0391573 A1* | 12/2019 | Wang | ............... | G05B 23/0254 |
| 2021/0096557 A1* | 4/2021 | Shelar | ............... | G05B 23/0259 |
| 2022/0198565 A1* | 6/2022 | Krishnaswamy | ...... | G06Q 10/20 |
| 2023/0161313 A1* | 5/2023 | Chandler | ............ | G05B 19/058 |
| | | | | 700/28 |

OTHER PUBLICATIONS

Degen Helmut et al: "How to Explain It to Facility Managers? A Qualitative, Industrial User Research Study for Explainability", Nov. 11, 2021 (Nov. 11, 2021), Nov. 11, 2021, pp. 401-422, XP047616115, https://doi.org/10.1007/978-3-030-90963-5_31.

Dibowski Henrik et al: "Knowledge-Based Fault Propagation in Building Automation Systems", 2016 International Conference on Systems Informatics, Modelling and Simulation (SIMS), IEEE, Jun. 1, 2016 (Jun. 1, 2016), pp. 124-132, XP033041789, DOI: 10.1109/SIMS.2016.22.

Kunz J C et al: "Support for Integrated Value-Based Maintenance Planning", IEEE Expert, IEEE Service Center, New York, NY, US, vol. 11, No. 4, Aug. 1, 1996 (Aug. 1, 1996), pp. 35-44, XP000627015, ISSN: 0885-9000, DOI: 10.1109/64.511775.

\* cited by examiner

| 500 | 502 Suggested Causes | 504 Confidence Level for Suggested Cause | 506 Causal Chain |
|---|---|---|---|
| 508 | SC 1 (= CF r) | 90% | CC 1 |
| 510 | SC 2 | 85% | CC 2 |
| 512 | SC 3 | 80% | CC 1 |
| 514 | SC 4 | 75% | CC 3 |
| 516 | ... | ... | ... |

FIG. 5A

| 520 | 522 Causal Chain | 524 Causal Factor | 526 Labels | 528 Rules | 530 Events | 532 Date / Time |
|---|---|---|---|---|---|---|
| 534 | CC 1 | CF 0 | Operating Mode | Rule 10 | Rule 10 | <date / time> |
| 536 | CC 1 | CF 1 | Trigger | Rule 11 | Rule 11 | <date / time> |
| 538 | CC 1 | ... | | | | <date / time> |
| 540 | CC 1 | CF r | Suggested Cause | Rule 21 | Rule 21 | <date / time> |
| 542 | CC 1 | ... | | | | <date / time> |
| 544 | CC 1 | CF r + f | Fault | Rule 13 | Rule 13 | <date / time> |

FIG. 5B

| 550 | 552 Suggested Causes | 554 Suggested Actions | 556 Confidence Level for Suggested Actions |
|---|---|---|---|
| 558 | SC 1 | SA 1 | 90% |
| 560 | SC 1 | SA 2 | 85% |
| 562 | SC 1 | SA 3 | 80% |
| 564 | SC 2 | SA 4 | 85% |
| 566 | SC 2 | SA 1 | 75% |

FIG. 5C

| | Causes | Actions | Probability | Cost of Action |
|---|---|---|---|---|
| | C 1 | A 1 | 90% | Cost 1 $ |
| | C 1 | A 2 | 85% | Cost 2 $ |
| | C 1 | A 3 | 80% | Cost 2 $ |
| | C 2 | A 4 | 85% | Cost 3 $ |
| | C 2 | A 1 | 75% | Cost 4 $ |

FIG. 6

| 1002 | [Site Identification] | | | |
|---|---|---|---|---|
| 1004 | Cause ID | Building | Suggested Cause | Criticality |
| | SC-1234 | B100 | CHWP-1 not running | Critical ▨ |

1006 — Faults
Rooms B-123, B-124, B-125, B-126 too warm

1008 — Suggested cause
Pump CHWP-1 is not running

1010 — Suggested action
Verify HOA switch is in auto-position

1012 — What happened? (Faults) ⟩
1014 — Why did it happen? (Causal chain) ⟩
1016 — What is the reason? (Suggested cause) ⟩
1018 — How to fix it? (Suggested action) ⟩
1020 — Did the fix work? (Effectiveness of action) ⟩

FIG. 10A

Value group 4

| | | |
|---|---|---|
| Value 4.1 | Value | Value |
| Value 4.2 | Value | ▨ Value |
| Value 4.3 | Value | Value |
| Value 4.4 | Value | Value |
| Value 4.5 | Value | ▨ Value |
| Value 4.6 | Value | Value |

Value group 5

| | | |
|---|---|---|
| Value 5.1 | Value | Value |
| Value 5.2 | Value | ▨ Value |
| Value 5.3 | Value | Value |

ⅴ Values not available: 4

| | Expected | Actual |
|---|---|---|
| Value group 1 | | |
| Value 1.4 | Value | n/a |
| Value 1.5 | Value | n/a |
| Value 1.6 | Value | n/a |
| Value group 2 | | |
| Value 2.4 | Value | n/a |

ⅴ Values contradicting suggested cause: 0

| | Expected | Actual |
|---|---|---|
| (none) | | |

FIG. 13B

| FIG. 16A |
|----------|
| FIG. 16B |
| FIG. 16  |

All customers – suggested causes (10) — 1600

| Customer | Building | Suggested cause | Impact (qual.) | Impact (qual.) | Criticality | Last occurrence | Work Order Status |
|---|---|---|---|---|---|---|---|
| 1606 | 1608 | 1610 | 1612 | 1614 | 1616 | 1618 | 1620 |
| Customer #1 | | | | | | | |
| SC-1221 | P-135 | Power failure | Productivity | | Critical | 4/6 | Created 4/6 > |
| Customer #1 | | | | | | | |
| SC-1354 | P-146 | Equipment mode override | Energy | | High | 4/7 | Not created > |
| Customer #2 | | | | | | | |
| SC-1198 | B-100 | OA damper overridden | Energy | $57 | High | Yesterday | Not created > |
| Customer #2 | | | | | | | |
| SC-1234 | B-100 | CHWP-1 not running | Comfort | 20% (10,000 SF) | Critical | Yesterday | Not created > |
| Customer #3 | | | | | | | |
| SC-1123 | M-13 | Chiller not supplying enough cold water | Productivity | | Critical | 4/7 | Not created > |
| Customer #4 | | | | | | | |
| SC-1154 | S-143 | AHU fan tracking program | Comfort | 12% (12,500 SF) | High | 4/8 | Not created > |
| Customer #3 | | | | | | | |
| SC-1187 | M-23 | Simultaneous heating and cooling | Energy | $3,789 | High | Yesterday | Not created > |

FIG. 16A

BUILDING AUTOMATION SYSTEM AND METHOD FOR MANAGING CAUSAL CHAIN FOR FAULT DETECTION AND DIAGNOSTICS

FIELD OF THE INVENTION

This application relates to the field of building automation systems and, more particularly, to a building automation system having fault detection and diagnostics capabilities.

BACKGROUND

A building should provide comfort and safety to its occupants. To achieve that goal, facility managers, such as energy engineers, professionally maintain buildings and their technologies for the benefit of their owners, tenants, and customers. Many building customers have various priorities that are important to them, which may be expressed as key performance indicators (KPIs) as an example of customer information. Examples of KPIs are energy costs, comfort, and sustainability. It is the responsibility of a facility manager to manage a building, influenced by a customer's KPIs.

Many commercial and residential facilities, including buildings and campuses, are equipped with a building management system (BMS). A BMS may encompass a wide variety of components that aid in the monitoring and control of various aspects of building operations. These systems may include security subsystems, fire safety subsystems, lighting subsystems, and environmental ("HVAC") subsystems. The elements of a building management system may be widely dispersed throughout a facility. One or more centralized control stations of the system may monitor data associated with the components and control various aspects of system operation.

The BMS is designed for building automation and maintains the facility in a state that is compliant with a set customer's priorities. If a fault occurs, then one function the BMS is to inform the facility manager about the building status and report faults. Faults are deviations from defined goals that may impact the customer's KPIs. A BMS report may indicate many faults and the reported faults require responsive actions. It is important for the facility manager to focus on the faults having the highest impact on the customer's KPIs. The time it takes for a facility manager act may ranges from about 15 minutes to several hours or even days, depending on the complexity of the building, the complexity of the faults, the root cause, and the complexity of a responsive action (including corrective and preventative actions).

Although conventional BMSs are capable of identifying faults, root causes and responsive actions for a particular building maintenance issue need to be identified by a facility manager, based on his or her experience. Causal factors and the responsive actions cannot be derived automatically. Thus, conventional systems require the facility manager analyzes the faults, recognize a fault pattern, identify the causal chain, and determine an effective responsive action. Most or all of these tasks are performed manually by the facility manager, based on the individual reported event and the skills and experiences of the facility manager. As a result, building issues are resolved cognitively by facility managers, which may take a relatively long period of time.

SUMMARY

In accordance with one embodiment of the disclosure, there is provided a causal chain management approach for building automation systems. The approach and its associated system understands a reported fault, identifies the causal factors, identifies the root cause, and determines an effective response action rapidly and automatically without requiring intervention by a facility manager. A causal chain is generated automatically and connects the various aspects of the system, including the operating condition, trigger, suggested causes (root cause), causal factors, faults, and suggested responsive actions. Based on the generated causal chain, the system automatically provides to one or more if its devices or other devices, and their associated users, information about what happened with regard to a fault, why did it happen (causal factors), what is the reason (suggested cause), how to fix the issue (suggested action), and whether the fix was effective. As a result, the time to action may be reduced substantially.

One aspect is a building automation system for managing causal chain comprising an input component, a processor, and an output component. The input component collects facility data of the building automation system. The processor generates at least one suggested cause and at least one causal chain based on the facility data. The processor further determines at least one responsive action based on the at least one suggested cause, the at least one causal chain, and a cause-action mapping. The output component provides a particular causal chain based on the at least one responsive action and manager information.

Another aspect is a method of a building automation system for managing causal chain. Facility data of the building automation system is collected. One or more suggested causes and one or more causal chains are generated based on the facility data. One or more responsive actions are determined based on the suggested cause or causes, the causal chain or chains, and a cause-action mapping. A particular causal chain is provided based on the at least one responsive action and manager information.

The above described features and advantages, as well as others, will become more readily apparent to those of ordinary skill in the art by reference to the following detailed description and accompanying drawings. While it would be desirable to provide one or more of these or other advantageous features, the teachings disclosed herein extend to those embodiments which fall within the scope of the appended claims, regardless of whether they accomplish one or more of the above-mentioned advantages.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects.

FIGS. 5A, 5B, and 5C are tabular views depicting component outputs of an example implementation resulting from the operational process of FIG. 4.

FIG. 6 is a tabular view depicting a mapping of causes to responsive actions in an example implementation of the operational process of FIG. 4.

FIGS. 10A and 10B are front planar views depicting menu, location, and causal chain information of an example implementation of a user interface of one or more management devices of FIG. 1.

FIG. 13, including FIGS. 13A and 13B, is a front planar view depicting suggested cause information of an example implementation of the user interface of FIGS. 10A and 10B.

FIG. 14, including

FIG. 16, including FIGS. 16A and 16B, is a front planar view depicting manager information, such as manager KPIs, of an example implementation of the user interface of FIGS. 10A and 10B.

DETAILED DESCRIPTION

Figure 1:
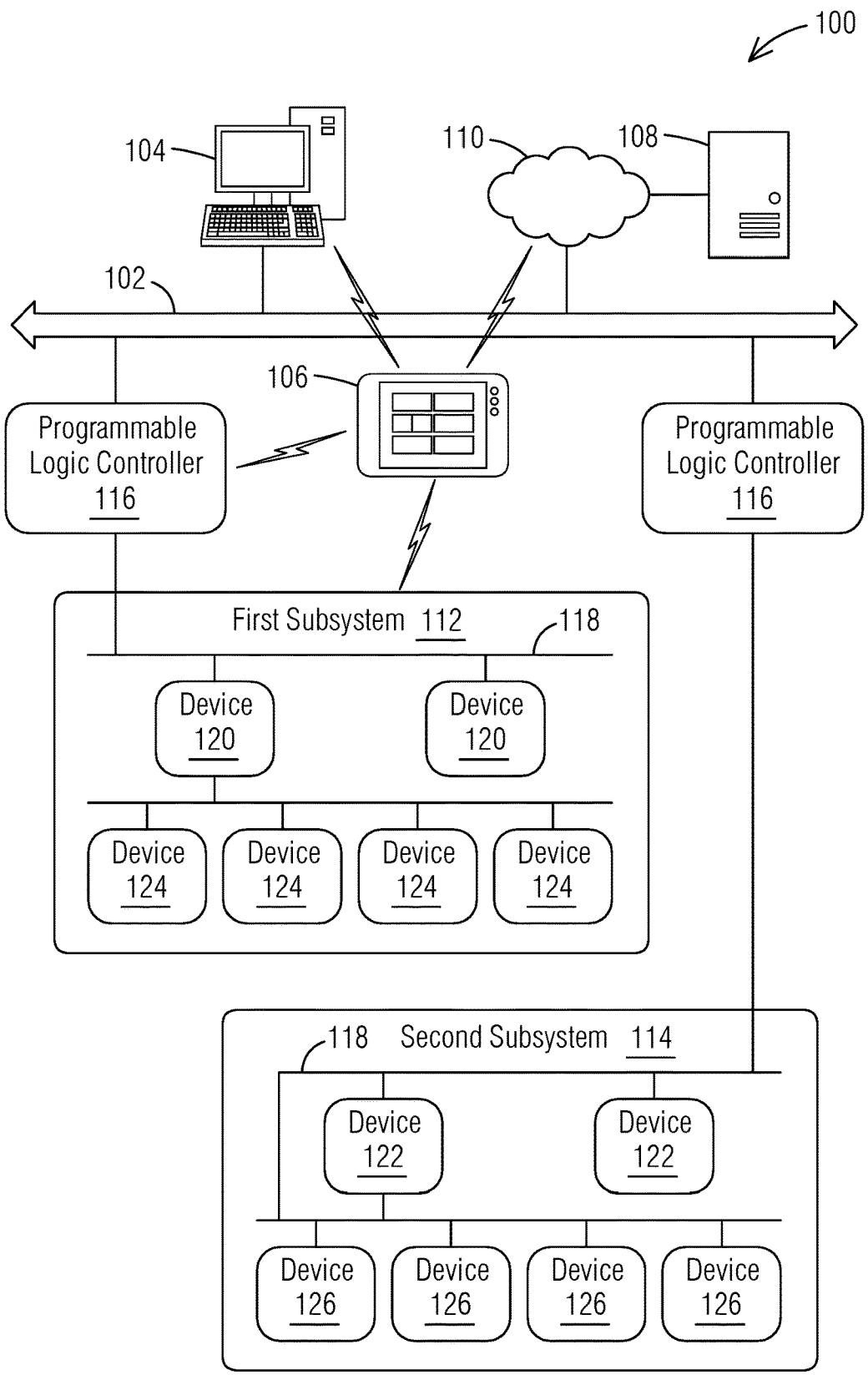
FIG. 1 is an illustration of a building automation system in an example implementation that is operable to employ techniques described herein.

Various technologies that pertain to systems and methods that facilitate causal chain management will now be described with reference to the drawings, where like reference numerals represent like elements throughout. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present application will be described with reference to exemplary non-limiting embodiments.

Referring to FIG. 1, there is shown a building automation system ("BAS" or "system") 100 in an example implementation that is operable to employ techniques described herein. The BAS 100 encompasses capabilities of a failure detection and diagnostics system that manages causal chains including, but not limited to, determining and linking them from effects to the actual failure and a responsive action automatically. The BAS 100 includes an environmental control system configured to control one or more environmental parameters for a facility, such as airflow, air pressure, air temperature, fluid flow, fluid pressure, fluid temperature, and the like. For example, the BAS 100 may comprise one or more network connections or primary buses 102 for connectivity to components of a management level network ("MLN") of the system. For one embodiment, the example BAS 100 may comprise one or more management level devices or management devices, such as a management workstation 104, a mobile device 106, or a remote management device 108 connecting through a wired or wireless network 110, that allows the setting and/or changing of various controls of the system. For example, a management device may be a mobile device connecting through a wired or wireless link to an individual automation or field level device, such as a controller 120-126, that allows the setting and/or changing of various controls of the device. While a brief description of the BAS 100 is provided below, it will be understood that the BAS 100 described herein is only one example of a particular form or configuration for a BAS. The system 100 may be implemented in any other suitable manner without departing from the scope of this disclosure. The management devices are configured to provide overall control and monitoring of automation devices, a field devices, and other controllers of the BAS 100.

For the illustrated embodiment of FIG. 1, the BAS 100 provides connectivity based on one or more communication protocols to subsystems for various environmental parameters, such as components of environmental comfort systems. Each subsystem 112, 114 may include various automation level devices 120, 124 ("automation controllers") for monitoring and controller field devices as well as various field level devices 122, 126 ("field controllers") for monitoring and controlling areas within a building or group of buildings. For field controllers 122, 126 that monitor and control air and/or fluid heating-cooling HVAC equipment, the field controllers may include, but are not limited to, actuators, sensors, and other types of controllers for the HVAC equipment, such as heating/cooling generators, fans, dampers, filters, pumps, compressors, condensers, evaporators, tanks/reservoirs, valves, bypass mechanisms, and the like.

For some embodiments, the BAS 100 may include one or more programmable logic controllers 116 for connectivity to components of a building level network (BLN) of the system 100. Each programmable logic controller 116 may connect the primary bus 102 of the MLN to a secondary bus 118 of the BLN. Each programmable logic controller 116 may also include management logic for switching, power quality, and distribution control for the BLN components. For example, automation controllers 120, 122 may communicate directly with the network connection or secondary bus 118 of the BLN, whereas field controllers 124, 126 may communicate through, and controlled by, the automation controllers.

In these illustrative embodiments, objects associated with the BAS 100 include data created, processed, and stored by the automation controllers 120, 124 and the field controllers 122, 126, such as temperature data, pressure data, and air/fluid flow, as well as analytical data, such as control schedules, trend reports, defined system hierarchies, and the like. The illustration of the BAS 100 in FIG. 1 is not meant to imply physical or architectural limitations to the manner in which different illustrative embodiments may be implemented. Other components in addition to and/or in place of the ones illustrated may be used, and some components may be unnecessary in some illustrative embodiments.

Figure 2:
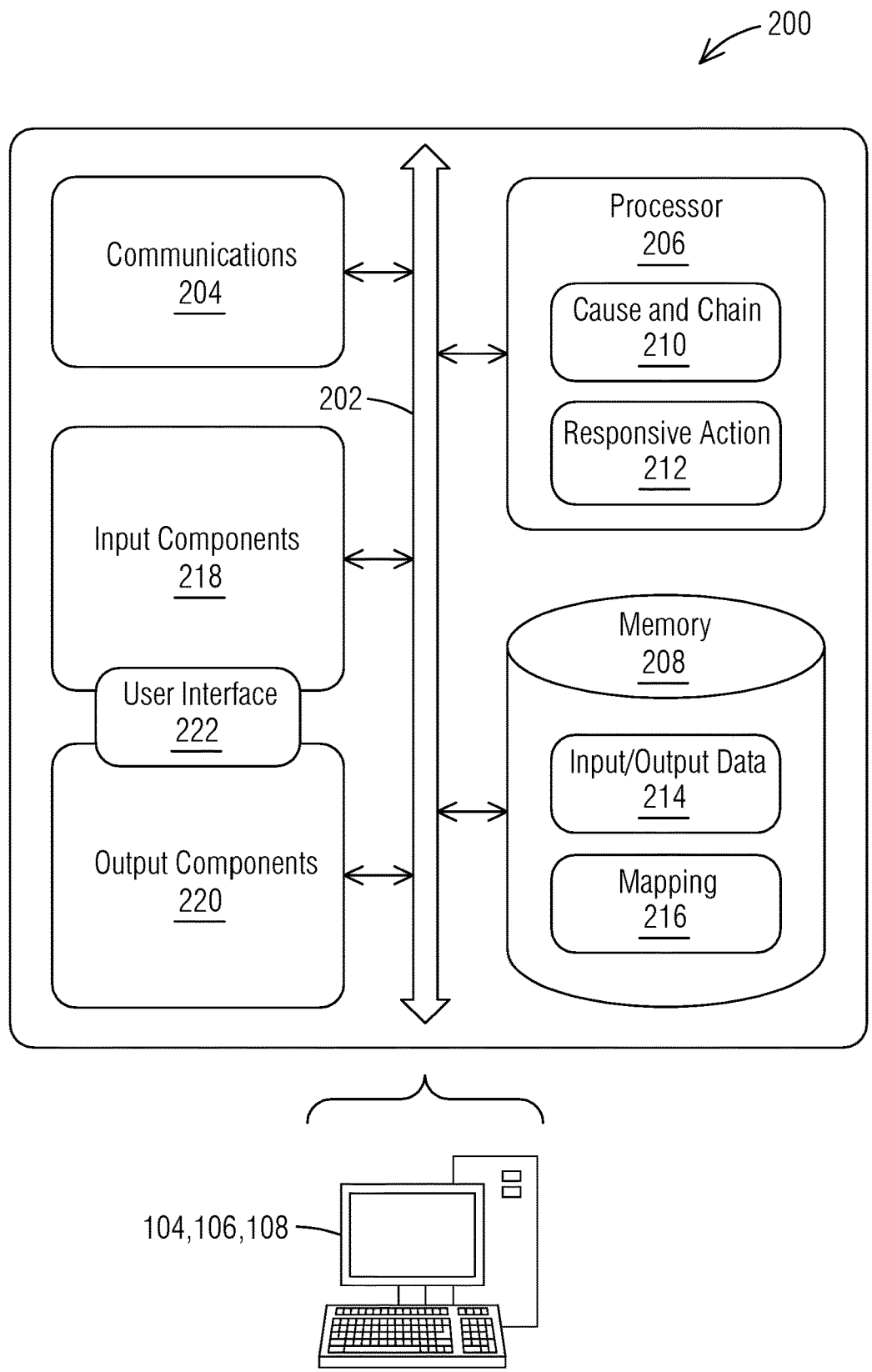
FIG. 2 is a block diagram of an example implementation of one or more management devices of FIG. 1.

FIG. 2 represents example device components 200 of one or more management devices 104-108 of the building automation system 100, described above in reference to FIG. 1, in an example implementation. The device components 200 comprise a communication bus 202 for interconnecting other device components directly or indirectly. The other device components include one or more communication components 204 communicating with other entities via a wired or wireless network, one or more processors 206, and one or more memory components 208.

The communication component 204 communicates (i.e., receives and/or transmits) data associated with one or more devices of the system 100, such as another management device 104-108 or a management device 104-108. The communication component 204 may utilize wired technology for communication; such as transmission of data over a physical conduit, e.g., an electrical or optical fiber medium. The communication component 204 may also utilize wireless technology for communication, such as radio frequency (RE), infrared, microwave, light wave, and acoustic communications. RE communications include, but are not limited to, Bluetooth (including BLE), ultrawide hand (UWB), Wi-Fi (including Wi-Fi Direct), Zigbee, cellular, satellite, mesh networks, PAN, WPAN, WAN, near-field communications, and other types of radio communications and their variants.

The processor or processors 206 may execute code and process data received from other components of the device components 200, such as information received at the communication component 204 or stored at the memory component 208. The code associated with the management device 104-108 and stored by the memory component 208 may include, but is not limited to, operating systems, applications, modules, drivers, and the like. An operating system includes executable code that controls basic functions, such as interactions among the various components of the device components 200, communication with external devices via the communication component 204, and storage and retrieval of code and data to and from the memory component 208.

Each application includes executable code to provide specific functionality for the processor 206 and/or remaining components of the management device 104-108. Examples of applications executable by the processor or processors 206 include, but are not limited to, a cause & causal chain module 210 and a responsive action module 212. The cause & causal chain module 210 may generate one or more suggested causes and one or more causal chains based on facility data. The responsive action module 212 may determine one or more responsive actions based on one or more suggested causes, one or more causal chains, and a cause-action mapping. The processor or processors 206 may support other modules, such as a machine learning ("ML") module to learn from one or more inputs of a facility manager and therefore extend a knowledge base associated with the ML module or assist one or more of the rule-based modules, such as the cause & causal chain module 210 and/or the responsive action module 212.

Data stored at the memory component 208 is information that may be referenced and/or manipulated by an operating system or application for performing functions of the management device 104-108. Examples of data associated with the management device 104-108 and stored by the memory component 208 may include, but are not limited to, input/output data 214 and cause-action mapping data 216.

The device components 200 may include one or more input components 218 and one or more output components 220. The input components 218 and output components 220 of the device components 200 may also include one or more visual, audio, mechanical, and/or other components. Examples of input components 218 include, but are not limited to, input interfaces for receiving data and/or commands from remote devices as well as keyboards, mice, touchscreens, microphones, and sensors. For example, one part of the input components 218 may collect facility data of the building automation system 100. Examples of output components 220 include, but are not limited to, output interfaces for providing data and/or commands to remote devices as well as displays, speakers, and motion devices. For example, one part of the output components 220 may provide a particular causal chain based on the one or more responsive actions, a manager information (such as a manager KPI), and rate-cost information. It is to be understood that manager information is based on information provided by a facility manager, facility owner, or other entities having an interest in the facility. The manager information or KPI refers to key performance indicators specified by one or more owners, occupants, or operators of the system as generated by, or provided manually to, a management device or other device associated with the building automation system. For some embodiments, the output component or components 218 include a display for providing the causal chain with at least one of a menu, location, faults, causal chain, suggested cause, suggested action, or effectiveness of responsive action.

For some embodiments, the input and output components 218, 220 may include a user interface 222 for interaction with a user of the device. The user interface 222 may include a combination of hardware and software to provide a user, such as a facility manager, with a desired user experience. For some embodiments, the facility manager may add a suggested cause and/or a suggested action manually. For some embodiments, the facility manager may modify a suggested cause or a suggested action. If the system is supported with an ML component such as the ML module described above, the ML component may learn from the facility manager's input and extend the knowledge base associated with the ML component.

It is to be understood that FIG. 2 is provided for illustrative purposes only to represent examples of the management device 104-108 and is not intended to be a complete diagram of the various components that may be utilized by the system 100. Therefore, the management device 104-108 may include various other components not shown in FIG. 2, may include a combination of two or more components, or a division of a particular component into two or more separate components, and still be within the scope of the present invention.

Figure 3:
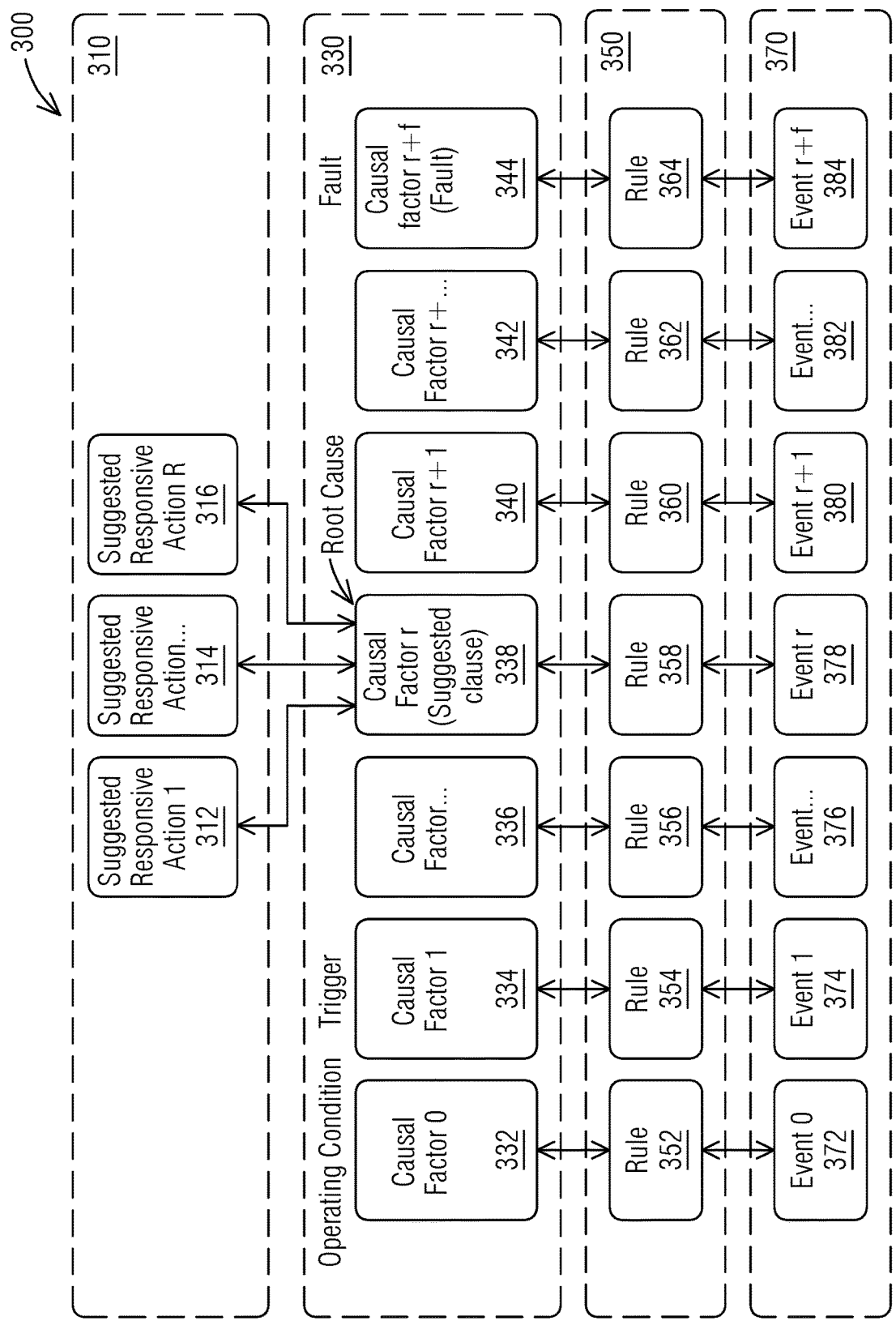
FIG. 3 is a diagrammatic view depicting an operational architecture of an example implementation of one or more management devices of FIG. 1.

Referring to FIG. 3, there is shown a diagrammatic view depicting an operational architecture 300 of one or more management devices 104-108. The system 100 automatically derives connected causal factors, suggested causes, and suggested responsive actions in accordance with the operational architecture 300. The operational architecture 300 comprises responsive actions 310, a causal chain 330, rules 350, and events 370. The responsive actions 310 of the operational architecture 300 include one or more automatically identified suggested responsive actions, such as suggested responsive actions 1 through R 312-316. The causal chain 330 of the operational architecture 300 includes multiple causal factors, such as causal factors 0 through r+f 332-344. Causal factor 0 (332) is associated with a pre-trigger operating condition. Causal factor 1 (334) follows causal factor 0 and is associated with a trigger. Causal factor r (338) is associated with a root cause in which "r" is a variable associate with the root cause. Causal factor r+f (344) is associated with a fault subsequent to the trigger in which "r" and "f" are variables associated with the root cause and fault, respectively. Causal factors 336 between the trigger and the root cause, if any, as well as causal factors 340, 342 between the root cause and the fault, if any, may also be identified. Likewise, the rules 350 and events 370 of the operational architecture 300 include multiple automatically triggered rules 352-364 and multiple automatically generated events 372-384, respectively.

The causal chain 330 is correlated with the rules 350 and events 370 of the operational architecture 300. Each causal factor 332-344 of the causal chain 330 is associated with a generated event 372-384 and a triggered rule 352-364. The system 100 identifies the causal factors 332-344 of the causal chain 330 based on the reported faults of the events 370. In particular, the system establishes documented trace between the causal chain 330 and the faults of the events 370. The causal chain 330 includes one or more root causes, i.e., causal factor r 338, in which is preceded by one or more causal factors not significantly associated with the root cause (such as causal factor 0 332) and a causal factor associated with a trigger 334. Subsequent to the root cause (causal factor r 338), there is a cause factor associated with the fault, such as causal factor r+f. In addition, the system 100 identifies one or more suggested responsive actions 312-316 of the responsive actions 310 associated with the root cause and establishes a trace between the root cause and the responsive actions.

The operational architecture 300 of the system 100 represents the causal chain 330, which may consider one or more causal factors 332-344. Referring to the causal factor 338 of the root cause, subsequent causal factors 340-344 are provided after the causal factor of the root cause. The causal chain may include causal factors 332-344 from the operating condition to the fault, which have the causal factors of the trigger and root cause. For some embodiments, the causal chain 330 may include N causal factors between the trigger and root cause (such as causal factor 336) as well as between the root cause and the fault (such as causal factors 340, 342). For example, a variable air volume unit ("VAV") may request temperature reduction from an air handling unit ("AHU") and, in response, the AHU may trigger an event 374, such as activation of a valve to a cooling coil. In the process, one or more causal factors 334 are identified and tracked, such as the inability of the valve to activate or otherwise operate. If appropriate, the system may determine that the inability of the valve to function is the root cause 338 but, in the interim, other causal factors may occur until the system realizes that the room temperature is too high. Thus, N quantity of causal factors may be measured and accumulated by the system 100 between the cause factor 334 of the trigger and the cause factor 344 of the fault. Accordingly, the causal chain 330 is determined by compiling causal factors 332-344 of the data structure and aggregating the causal factors of the causal chain.

Figure 4:
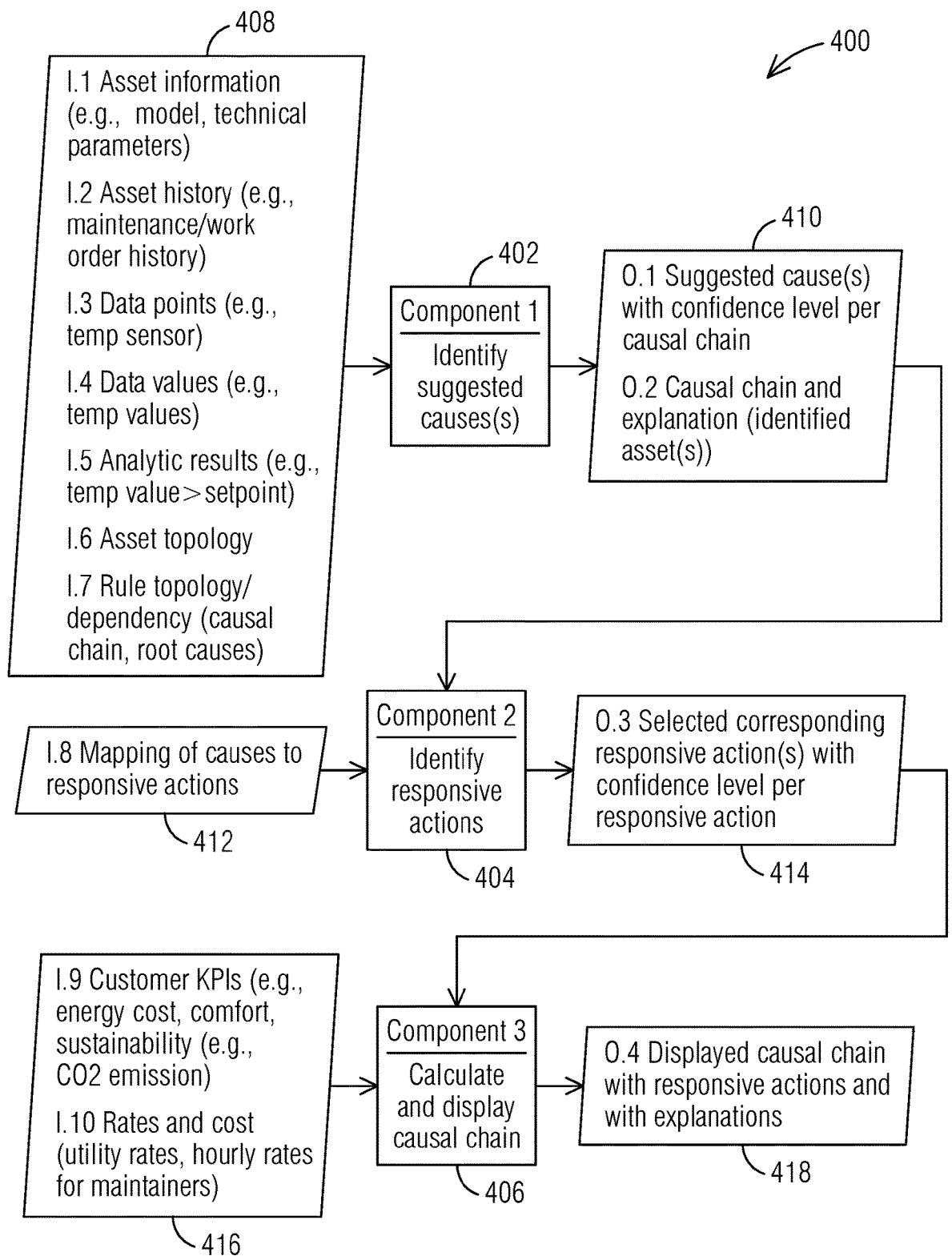
FIG. 4 is a flow diagram depicting an operational process of an example implementation of one or more management devices of FIG. 1.

Referring to FIG. 4, there is shown a flow diagram depicting an operational process 400 of one or more management devices 104-108. To select a fault and to initiate a responsive action, the system recognizes a reported fault, selects and understands the reported fault, understands the suggested cause for a selected fault, identifies one or more responsive actions to address the root cause, determines the impact on the manager's information (such as a manager's KPIs) for the identified responsive actions, and selects and initiates a responsive action to address the root cause. It is to be understood that manager information is based on information provided by a facility manager, facility owner, or other entities having an interest in the facility.

The operational process 400 of the system 100 comprises a first component 402 to identify suggested causes, a second component 404 to identify responsive actions, and a third component 406 to provide a causal chain. The causal chain is managed by collecting facility data 408 corresponding to various points of the building automation system 100. Points is standard term of building automation systems 100 describing a control operation, such as a sensing action or a controlling action. The facility data may include, but are not limited to, asset information, asset history, data points, data values, analytic results, asset topology, and rule topology. For example, the asset information may include models and technical parameters, the asset history may include maintenance or work order history, the data points may include sensors, the data values may include sensor values, the analytic results may include conditions where data values meet or exceed a setpoint, and the rule topology may include dependencies, causal chain, and/or root causes. For some embodiments, the facility data includes at least one of asset information, data point values, analytic results, asset topology, or rule topology.

In response to identifying the suggested cause or causes, the first component 402 of the operational process 400 may generate one or more suggested causes and one or more causal chains 410 based on the facility data 408. For some embodiments, each suggested cause may include a confidence level per causal chain. For some embodiments, the causal chain may include an explanation, such as identified assets and the activity the assets performed when a reported event occurred.

In response to identifying the responsive actions, the second component 404 of the operational process 400 may determine one or more responsive actions based on the suggested cause or causes 410, the causal chain or chains 410, and a cause-action mapping 412. The cause-action mapping provides a mapping of cases to responsive actions. For some embodiments, the suggested cause(s) and/or responsive action(s) may be added, modified, or otherwise determined automatically by the system 100. For example, the system 100 may determine the suggested cause(s) and/or responsive action(s) based on rules and data inputs as described herein. For a system that includes an ML component, the ML component may learn from the facility manager's input and extend the knowledge base associated with the component. For some embodiments, the system 100 may make determinations based on one or more the suggested causes and/or responsive actions added or modified at a user interface of the system 100 by an external source, such as a facility manager.

In response to providing the causal chain, the third component 406 of the operational process 400 may provide a particular causal chain 418 based on the responsive action or actions 414, a manager information 416, and rate-cost information 416. Examples of the manager information include, but is not limited to, energy cost, comfort, sustainability (such as $CO^2$ emission), up time, compliance, and space utilization. It is to be noted that a causal chain may impact more than one manager information. For example, the causal chain may cause a cost impact (e.g., energy costs due to the HVAC system is running frequently without adding value or adding heat to its surroundings), a sustainability impact (e.g., $CO^2$ emission), and/or a comfort impact (area/room is too hot or too cold). As a specific example, fixing a stuck valve, for example, may improve occupant comfort and reduce $CO^2$ emissions. Examples of the rate-cost information include, but is not limited to, utility rates, hourly rates for maintainers, and material costs (such as replacement components and/or spare parts). The causal chain provided by the third component 406 includes responsive actions and explanations.

Referring to FIGS. 5A, 5B, and 5C, there are shown tabular views depicting component outputs resulting from the operational process. FIG. 5A illustrates a first tabular view 500, corresponding to suggested causes 410 output from the first component 402, which includes one or more suggested causes 502 with confidence level 504 per causal chain 506. For the example shown in FIG. 5A, the first tabular view 500 includes a line item below the header 508 for each of the multiple suggested causes 510-518. For example, as shown by the suggested causes 502, confidence level for suggested cause 504, and causal chain 506 for the first line item 510, suggested cause SC 1 is the root cause of cause chain CC 1 with a confidence level of 90%. FIG. 5B illustrates a second tabular view 520, corresponding to suggested causes 410 output from the first component 402, which includes one or more causal chains 522 and corresponding explanations or identified assets 524-532. The explanation may include, but are not limited to, causal factors 524, labels 526, rules 528, events 530, and/or date/time 532. For the example shown in FIG. 5B, the second tabular view 520 includes a line item below the header 534 for each of the multiple causal chains 536-546. For this example, all causal factors of causal chain CC 1 are identified by line items 536-546. Also, CF r is identified by label 526 and a fourth line item 542 as the suggested cause of causal chain CC 1. FIG. 5C illustrates a third tabular view 550, corresponding to responsive actions 414 output from the second component 404, which includes one or more suggested causes 552 and corresponding responsive actions 554 with confidence level for suggested actions 556. For the example shown in FIG. 5C, the third tabular view 550 includes a line item below the header 558 for each of the multiple suggested causes 560-568. For this example, there are three suggested responsive actions 554, first through third line items 560-564, identified for SC 1, and the suggested action SA 1 has a confidence level of 90%.

Referring to FIG. 6, there is shown a tabular view depicting a mapping of causes to responsive actions in an example implementation of the operational process. FIG. 6 illustrates a fourth tabular view 600, corresponding to cause-action mapping 412 input to the second component 404, which includes one or more causes 502 with corresponding actions 604. The fourth tabular view 600 may also include mapping explanations, such as probability 606 and cost of action 608, for each of the line items 610-620 below the header 610. For this example, actions 1 through 3 matching to causes C 1 are identified for first through third line items 612-616, with varying explanations 606, 608 for two or more line items.

Figure 7:
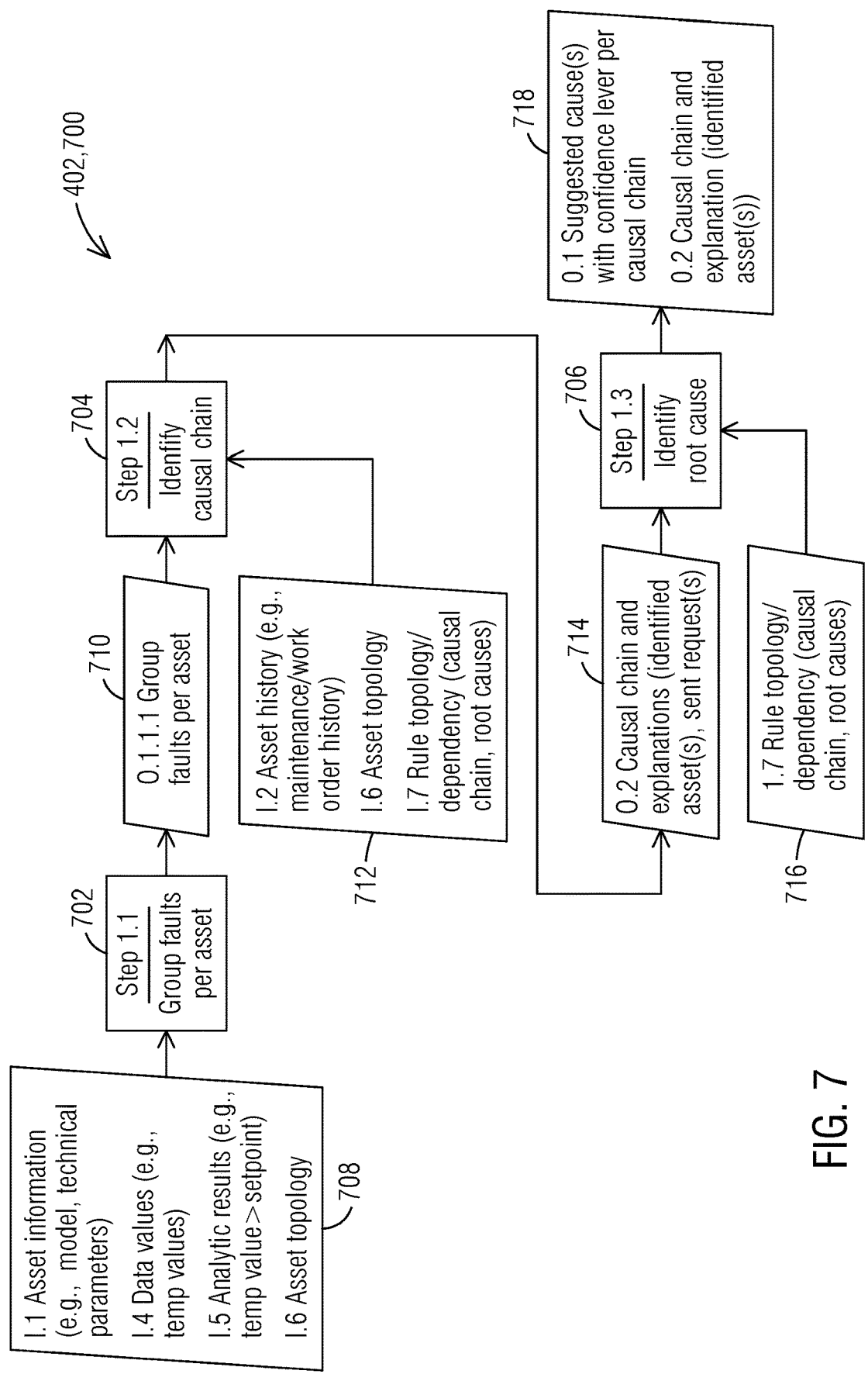
FIG. 7 is a flow diagram depicting a first operational process of an example implementation of the operational process of FIG. 4.

Referring to FIG. 7, there is shown a flow diagram depicting a first operational process 700 of the operational process. The first operational process 700 corresponds, in part, to the first component 402 and includes grouping faults per asset 702, identifying causal chain 704, and identifying root cause 706. For the first operational process 700, the system 100 may generate one or more suggested causes by grouping faults per asset 710 based on the asset information 708, the data point values 708, analytic results 708, and the asset topology 708 of the facility data 408. In particular, the analytical results (faults) are reviewed, the faults are checked against the asset information and the asset topology, and then the faults are grouped per asset.

The system may identify one or more causal chains 714 based on the faults per asset 710, the asset topology 712, and the rule topology 712 of the facility data 402. In particular, the assets with their grouped faults are matched against the asset and rule topology. Causal chains from the rule topology that match the assets with the faults are selected. For some embodiments, the asset topology 712 may include asset history, such as maintenance/work order history. Examples of rule topology include, but are not limited to, dependencies, causal chain, and root causes. Examples of explanations associated with causal chain include, but are not limited to, identified assets and sent requests.

The system 100 may identify one or more suggested causes 718 based on one or more causal chains 714 and the rule topology 716. In particular, the selected causal chain is matched with the rule topology. The best matching root cause is selected, and the quality of the match is reflected with a confidence level. For some embodiments, the suggested cause or causes best match the rule topology. The suggested causes may include confidence level per causal chain. For some embodiments, each suggested cause includes a cause confidence level per causal chain reflecting a quality of matching the suggested cause or causes to the rule topology.

Figure 8:
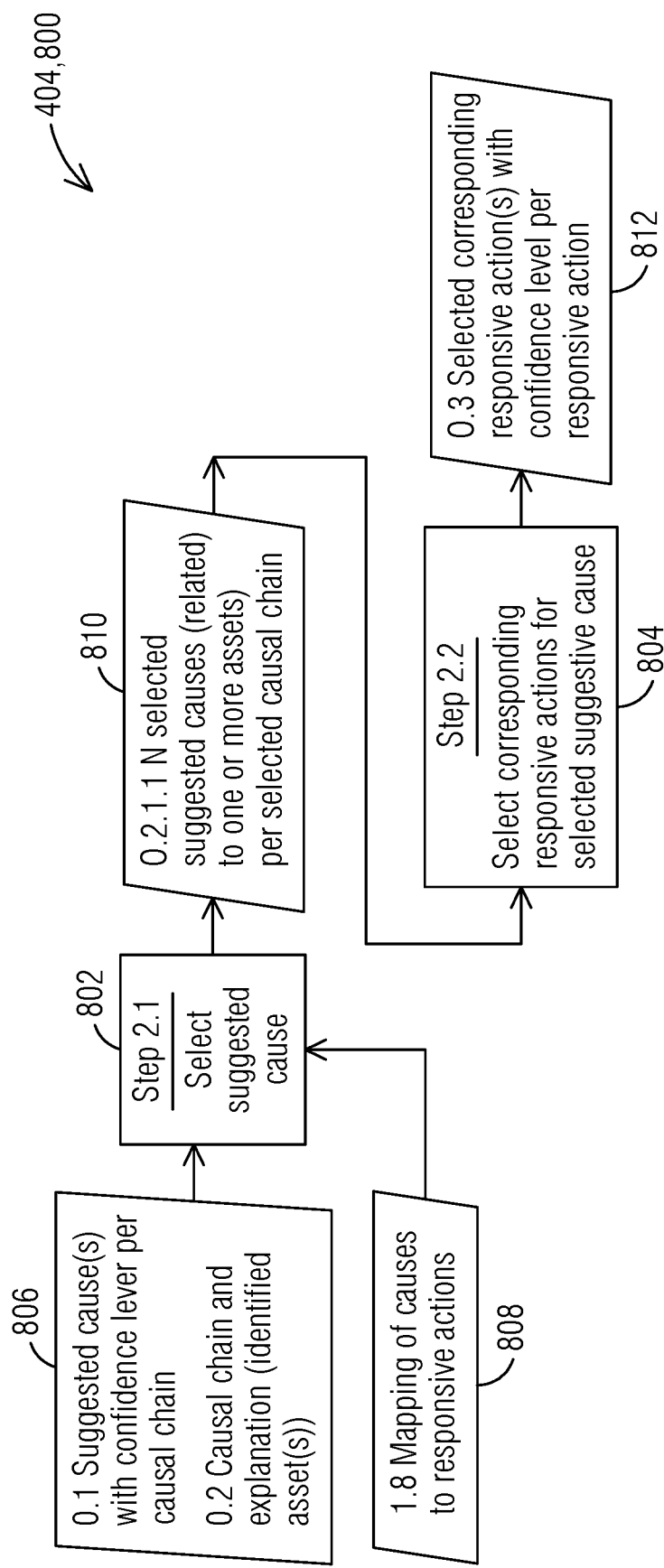
FIG. 8 is a flow diagram depicting a second operational process of an example implementation of the operational process of FIG. 4.

Referring to FIG. 8, there is shown a flow diagram depicting a second operational process of the operational process. The second operational process 800 corresponds, in part, to the second component 404 and includes selecting suggested cause 802 and selecting corresponding responsive actions for selected suggested cause 804. In particular, the system 100 may select n suggested causes per selected causal chain based on highest confidence level. For the second operational process 800, the system 100 may determine one or more responsive actions by selecting one or more selected suggested causes 810 of the suggested cause 806 or causes based on one or more causal chains 806 and the cause-action mapping 808.

The system 100 may select one or more responsive actions 812 based on the selected cause or causes 810. In particular, the system 100 selects responsive actions based on the mapping of causes to responsive actions, for example, by most common and/or most probable actions. The system 100 may calculate and assign a confidence level for each selected responsive action based on the match. For some embodiments, each selected cause being selected has a higher confidence level than any non-selected causes per causal chain. For some embodiments, the responsive action or actions are selected by selecting the responsive action or actions based on a comparison of causes to responsive actions. Also, the system 100 determines an action confidence level for each responsive action based on a quality of matching the causes to the responsive actions. For some embodiments, the quality is a measurable quality based on knowledge whether the responsive action would resolve the failure.

Figure 9:
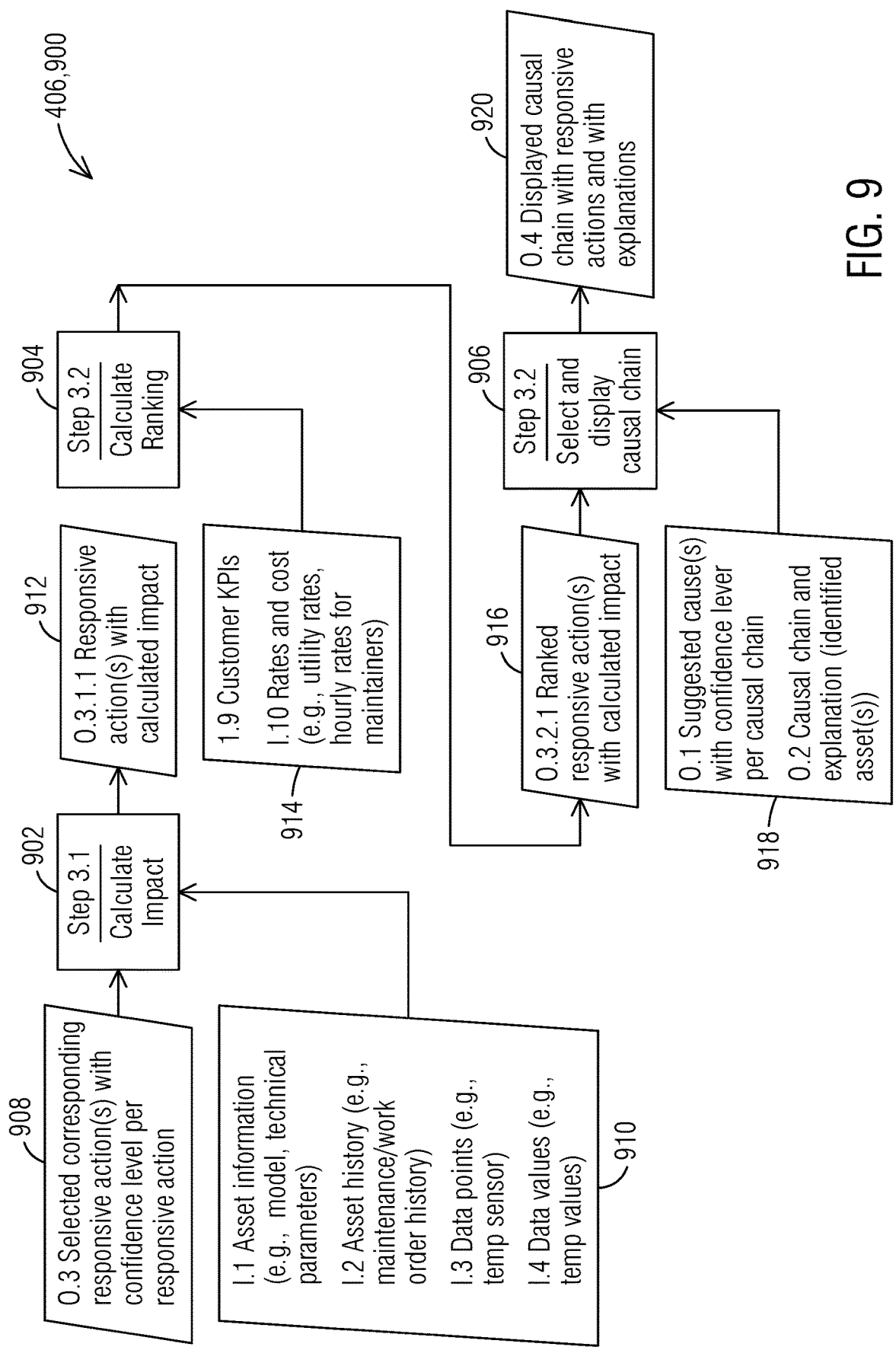
FIG. 9 is a flow diagram depicting a third operational process of an example implementation of the operational process of FIG. 4.

Referring to FIG. 9, there is shown a flow diagram depicting a third operational process of the operational process. The third operational process 900 corresponds, in part, to the third component 406 and includes calculating impact 902, calculating ranking 904, and providing a causal chain 906. For some embodiments, providing the particular causal chain comprises determining a responsive action cost based on the at least one responsive action. The system 100 may calculate impact for each action 912 based on selected corresponding responsive action or actions 908, asset information 910 (including asset history), and the data point values 910 (including data points). In particular, the system 100 may determine cost (such as labor and material cost related to action), energy cost (currency), sustainability (for example, CO2 emission), and state of the art calculation models related to cause.

The system 100 may rank one or more selected responsive actions 916 of the responsive actions based on the responsive action cost (i.e., the responsive action or actions with calculated impact 912), manager information 914, and/or rate-cost information 914. For some embodiments, the responsive action cost includes a labor or material cost and a responsive action impact related to the responsive action. Also, the responsive action impact may include one or more of an energy cost or a sustainability value. For some embodiments, the selected responsive action may be weighted based on the manager information and the rate-cost information.

The system 100 may provide the particular causal chain 920 to an output component 220 based on the selected responsive action or actions 916 as ranked. For some embodiments, the system 100 may also consider suggested causes with confidence level per causal chain 918 and causal chain and explanation 918. For some embodiments, the system 100 may provide (display or otherwise output) responsive actions with calculated impact such that all provided data and/or objects are connected. The output component includes a display for providing the causal chain with one or more of the following: a menu, location, faults, causal chain, suggested cause, suggested action, or effectiveness of action. The causal chain includes causal factors are associated with asset information, including the asset as well as information associated with the asset. For some embodiments, a ticket may be prepared by populating the relevant information of the causal chain including the suggested action. In this manner, the system or a facility manager may easily initiate the suggested action, thus saving time and expense.

Figure 10B:
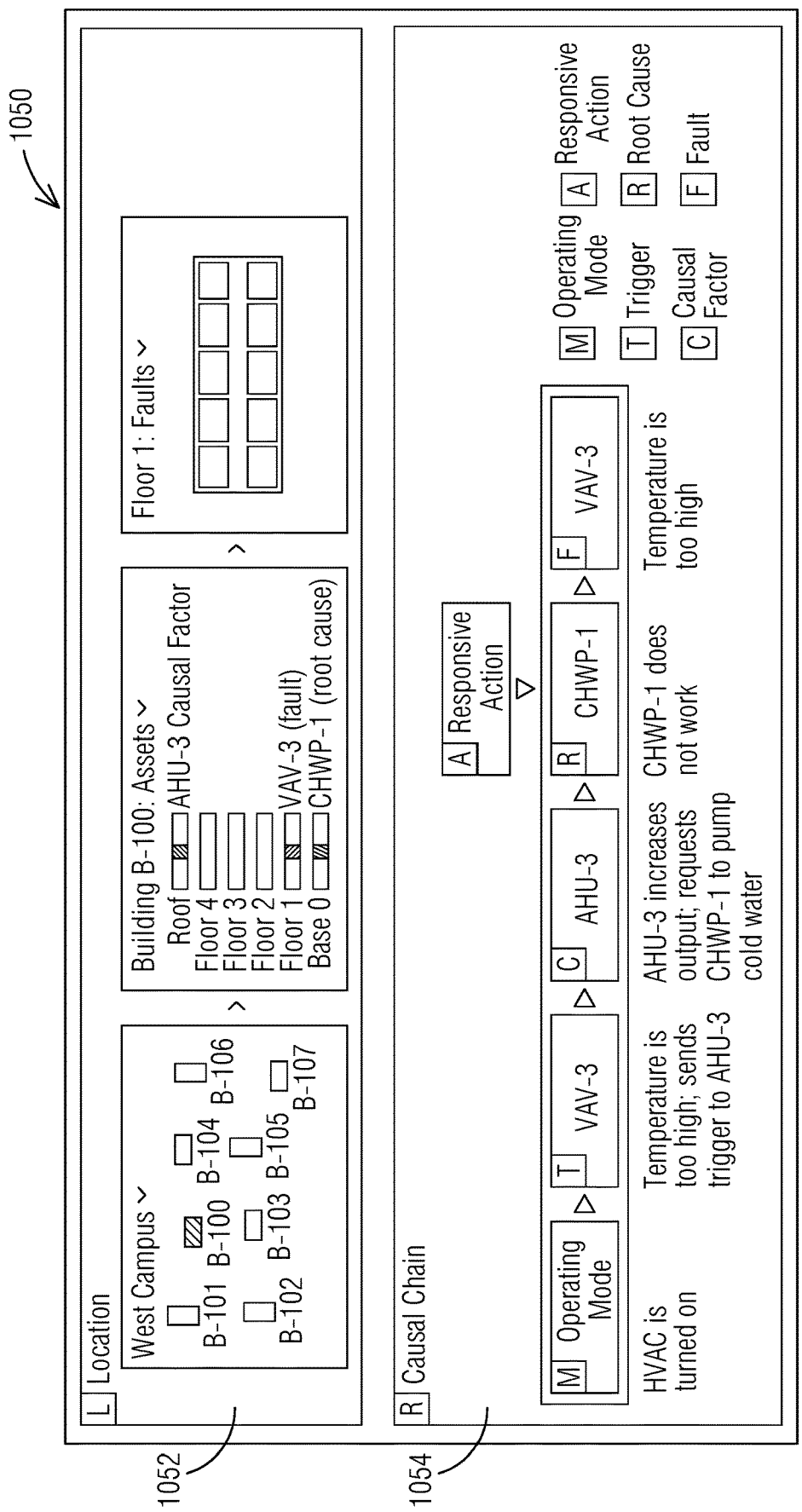

Referring to FIGS. 10A and 10B, there are shown screen views depicting menu, location, and causal chain information of a user interface of one or more management devices. Referring specifically to FIG. 10A, a menu 1000 of the user interface include a site identification 1002 as well as supplemental identification 1004 such as cause identification, building identification, suggested cause, and criticality. For some embodiments, the menu 1000 may also include detailed information about a fault 1006, such as a room temperature issue; a suggested cause 1008, such as a pump issue; and/or a suggested action 1010, such as a verification of a certain configuration. The menu further includes multiple menu options leading to additional information, such has those represented by FIGS. 11 through 15. Examples of menu options include, but not limited to, faults 1012, causal chain 1014, suggested cause 1016, suggested action 1018, and/or effectiveness of action 1020. Referring specifically to FIG. 10B, location information 1052 and causal chain information 1054 are provided. Examples of location information 1052 include, but are not limited to, a facility with multiple buildings in which a particular building is identified, multiple floors of a building in which a status of one or more floors is identified, and/or multiple areas of a floor in which a status of one or more areas is identified. Examples of causal chain information 1054 are causal chain fields that include, but not limited to operating mode, trigger, causal factor, responsive action, root cause, and/or fault. For some embodiments, the causal chain information 1054 may include status or equipment information corresponding one or more causal chain fields.

Figure 11:
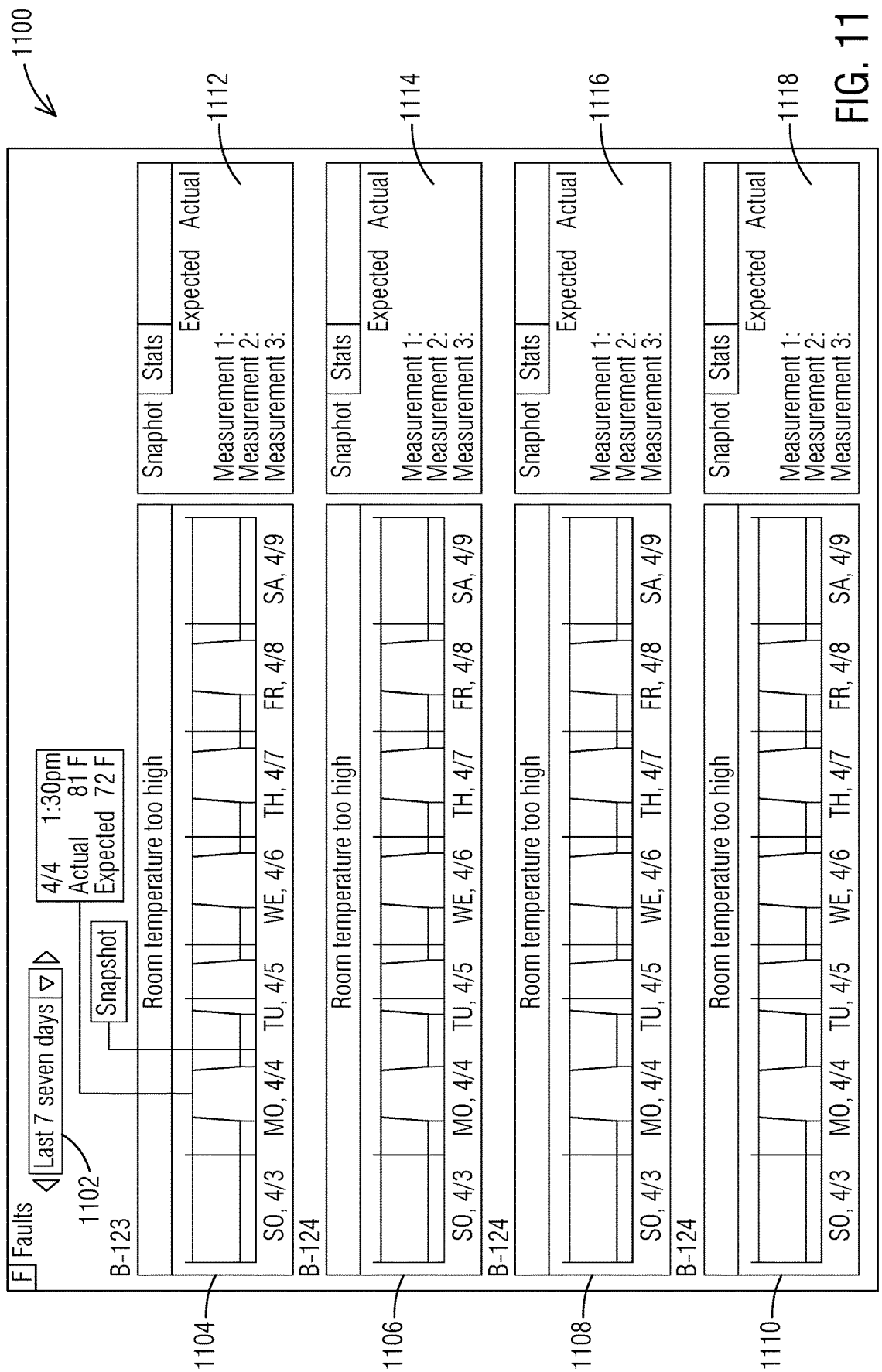
FIG. 11 is a front planar view depicting faults information of an example implementation of the user interface of FIGS. 10A and 10B.

Referring to FIG. 11, there is shown a screen view depicting faults information 1100 of the user interface. The faults information 1100 includes a time period indicator 1102 provided automatically by the system 100 or specifier that may be provided manually by a user. The faults information 1100 also includes one or more faults 1104, 1106, 1108, 1110 detected by the system 100 as well as corresponding data 1112, 1114, 1116, 1118 collected for each fault. Examples of the corresponding data 1112, 1114, 1116, 1118 include, but are not limited to, fault identification, fault description, snapshot information providing one or more expected and actual measurement values, or statistical information associated with the corresponding fault.

Figure 12:
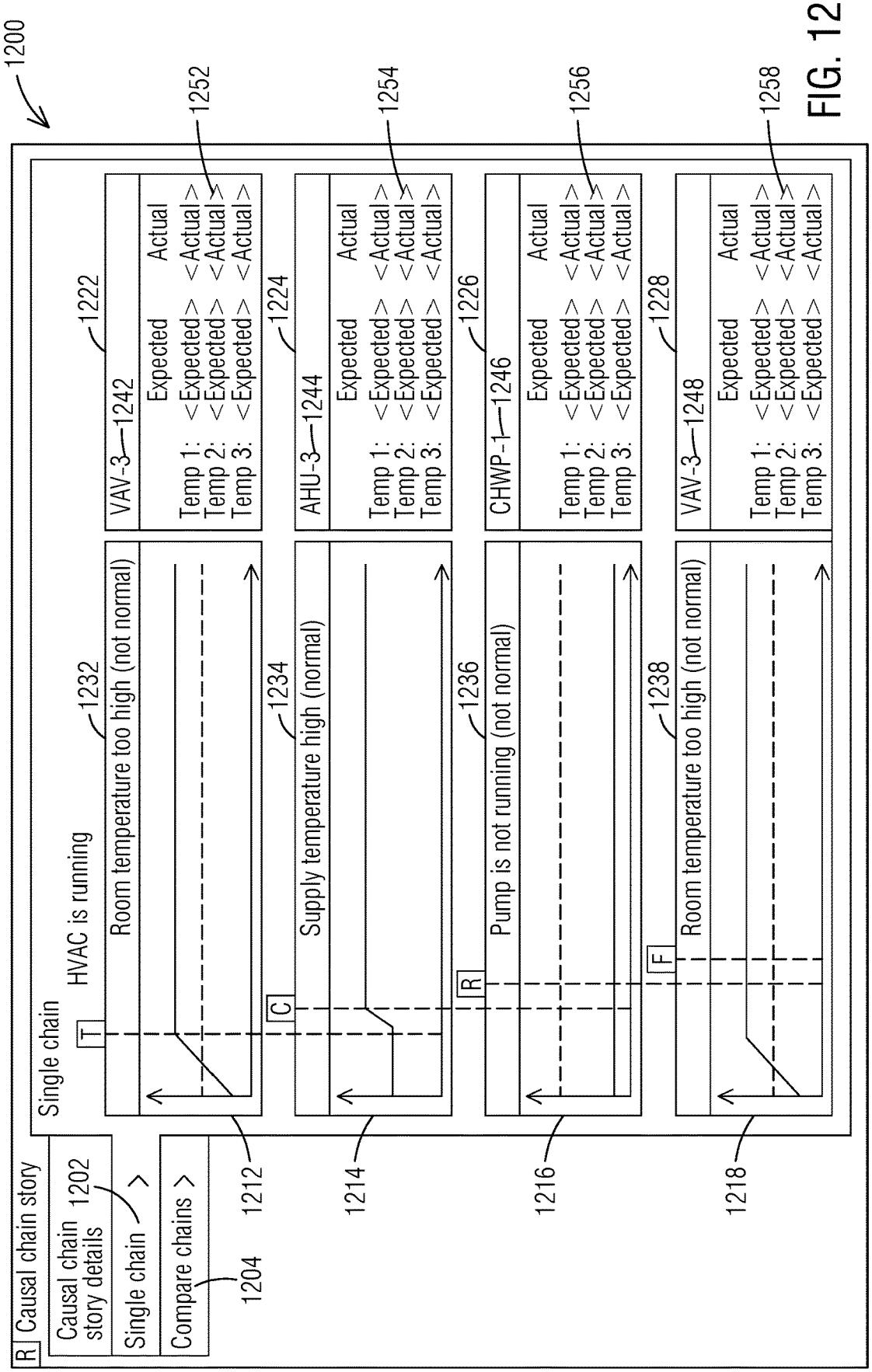
FIG. 12 is a front planar view depicting causal chain information of an example implementation of the user interface of FIGS. 10A and 10B.

Referring to FIG. 12, there is shown a screen view depicting causal chain information 1200 of the user interface. The causal chain information 1200 may include single chain details 120, a comparison of multiple chains 1204, or both. The causal chain information 1200 includes one or more status data 1212-1218, 1222-1228 regarding one or more causal chains. In particular, identified assets 1242-1248 and corresponding states 1232-1238 of the assets associated with each set of data 1212-1218, 1222-1228 provide a useful representation of the causal chain information 1200. For example, one causal chain may include information about room temperature 1232, 1238, supply temperature 1234, pump operation 1236, and the like, as well as whether or not each piece of information is within a predetermined normal range or not. For some embodiments, the causal chain information 1200 may also include equipment identification 1242-1248 and/or a comparison of expected and actual measurements 1252-1258 corresponding to each piece of information. The sequence of events, together with the assets and the asset status, forms the causal chain story, which are highly explainable.

Figure 13A:
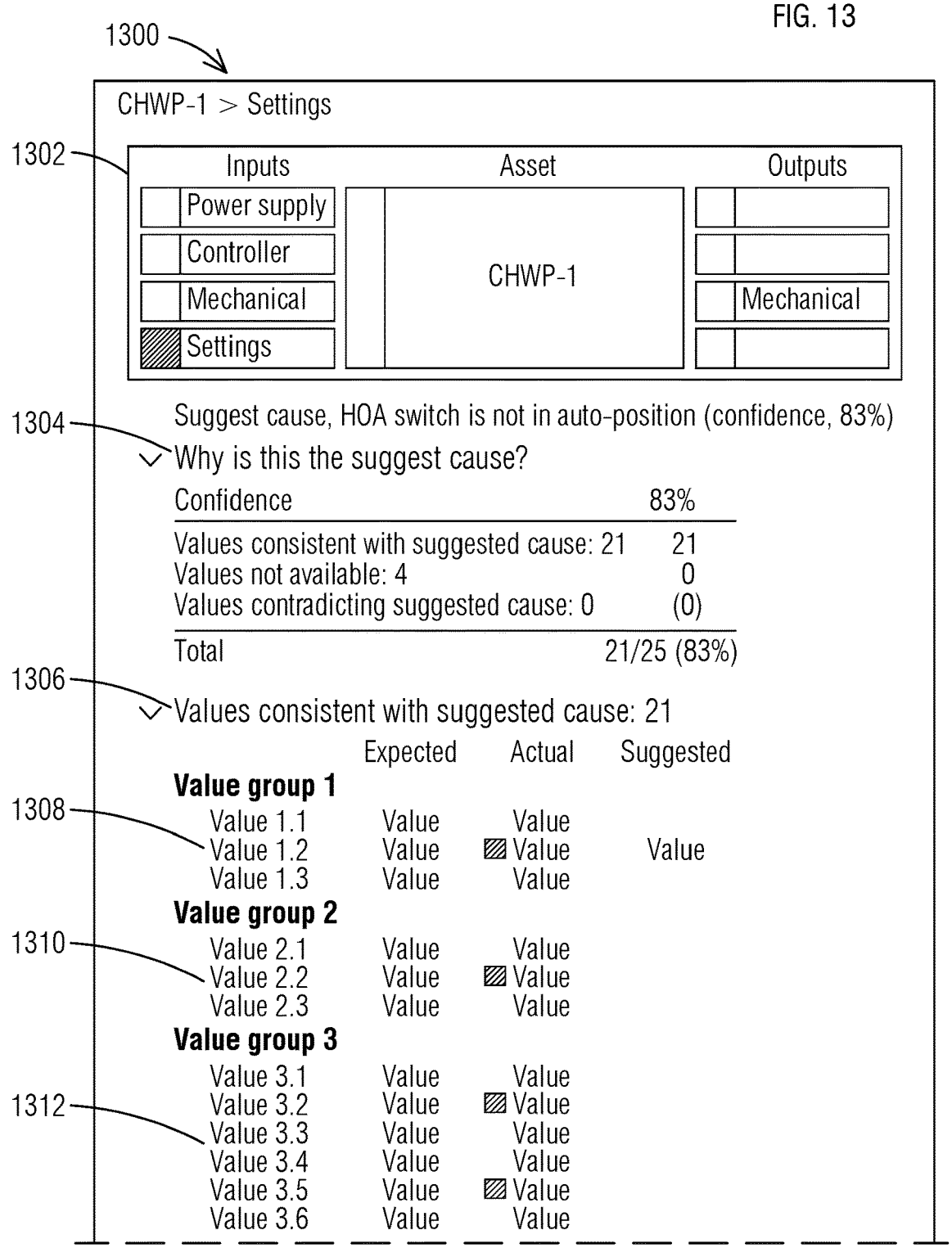

Referring to FIG. 13 (including FIGS. 13A and 13B), there is shown a screen view depicting suggested cause information 1300 of the user interface. The suggested cause information 1300 includes a visual representation 1302 of inputs and outputs of a particular asset (such as a water pump of the AHU). For example, each of the inputs and outputs may provide a status of power supply, controller, mechanical, and/or settings of the corresponding asset. The suggested cause information 1300 may also include groups representing cause confidence information 1304 associated with a particular cause, values consistent with the suggested cause 1306, values not available 1318, and/or values contradicting suggested cause 1324. Each of these groups may include more detailed information about the values in the form of subgroups 1308-1316 and 1320-1322. The confidence information 1304 provides an overall confidence value and, for some embodiments, may include values supporting the overall confidence value. For example, the overall confidence value may be a percentage value determined based on the values consistent with the suggested cause and the values not consistent with the suggested cause (such as the values not available and the values contradicting suggested cause).

Figure 14A:
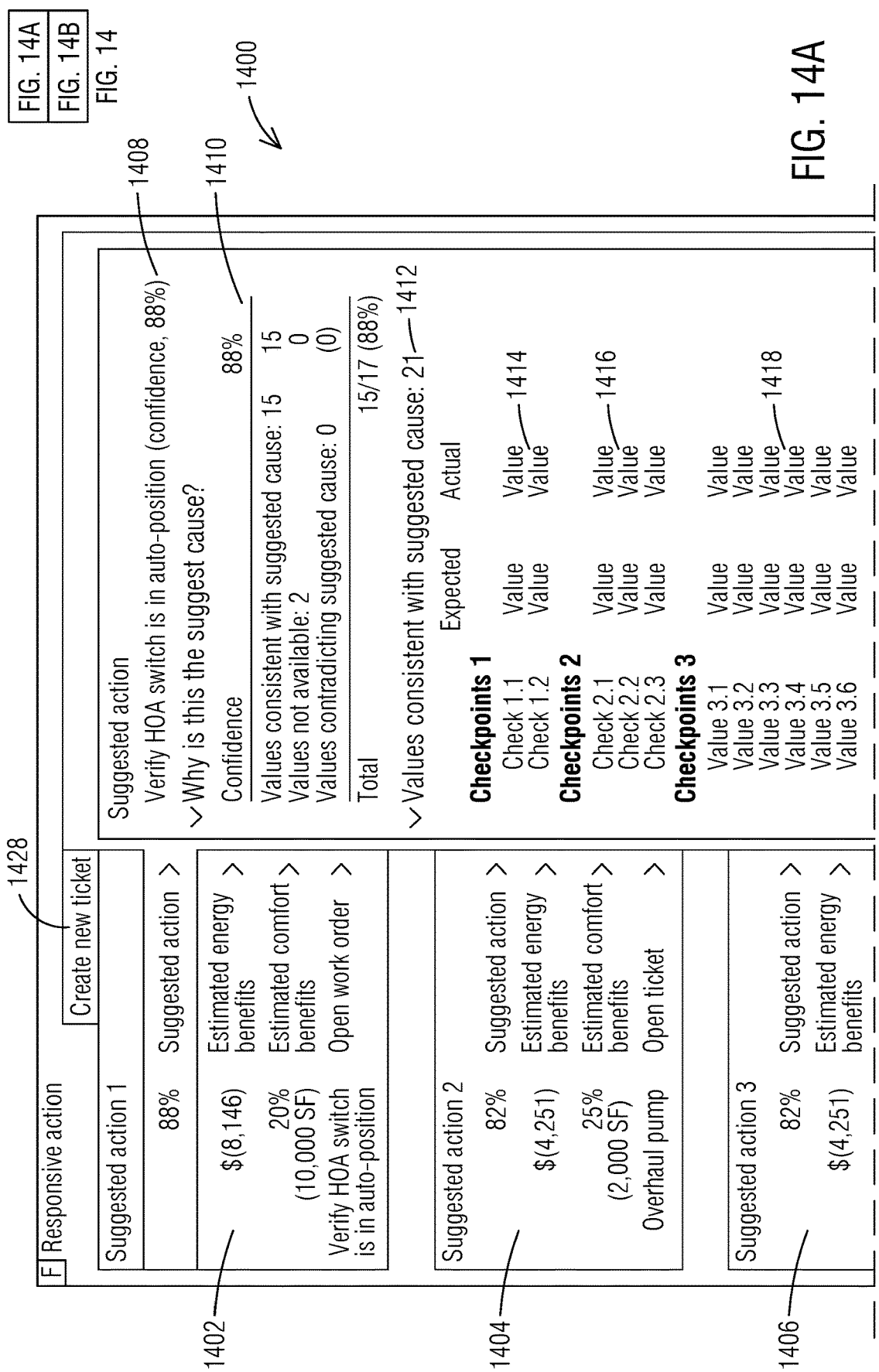
FIGS. 14A and 14B, is a front planar view depicting suggested action information of an example implementation of the user interface of FIGS. 10A and 10B.
Figure 14B:
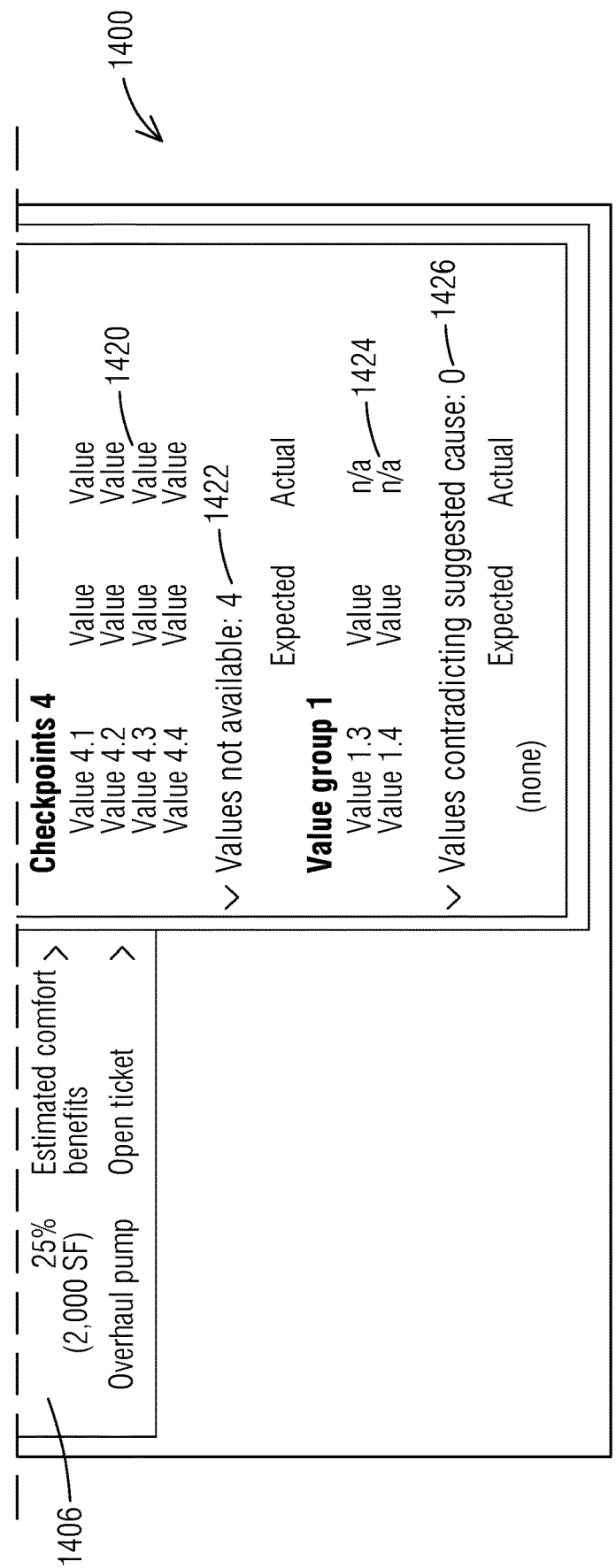

Referring to FIG. 14 (including FIGS. 14A and 14B), there is shown a screen view depicting suggested action information 1400 of the user interface. The suggested action information 1400 includes one or more suggested responsive actions 1402-1406 that may be pursued to address any outstanding suggested causes, in which each responsive action includes an action confidence level. For example, each suggested responsive action 1402-1406 may have an action confidence level in the form of a percentage value based on values consistent with suggested cause and values not consistent with suggested cause. In addition to the confidence level, each suggested responsive action 1402-

1406 may provide a description of the suggested responsive action as well as more detailed information about the suggested action, estimated energy benefits, estimated comfort benefits, and/or any related work orders. For example, the suggested action of a particular suggested responsive action 1402-1406 may include the description of the suggested responsive action 1408 (such as verification of a status of a certain component) and values supporting the action confidence level 1410. For example, the action confidence value may be a percentage value determined based on the values consistent with the suggested causes and the values not consistent with the suggested causes (such as the values not available and the values contradicting suggested cause). For some embodiments, the suggested action may further include more detailed information about the values consistent with the suggested causes 1412-1420, the values not available 1422-1424, and the values contradicting suggested cause 1426. For some embodiments, the suggested action information 1400 may further include an ability to generate a work order 1428 corresponding to one or more suggested responsive actions 1402-1406.

Figure 15:
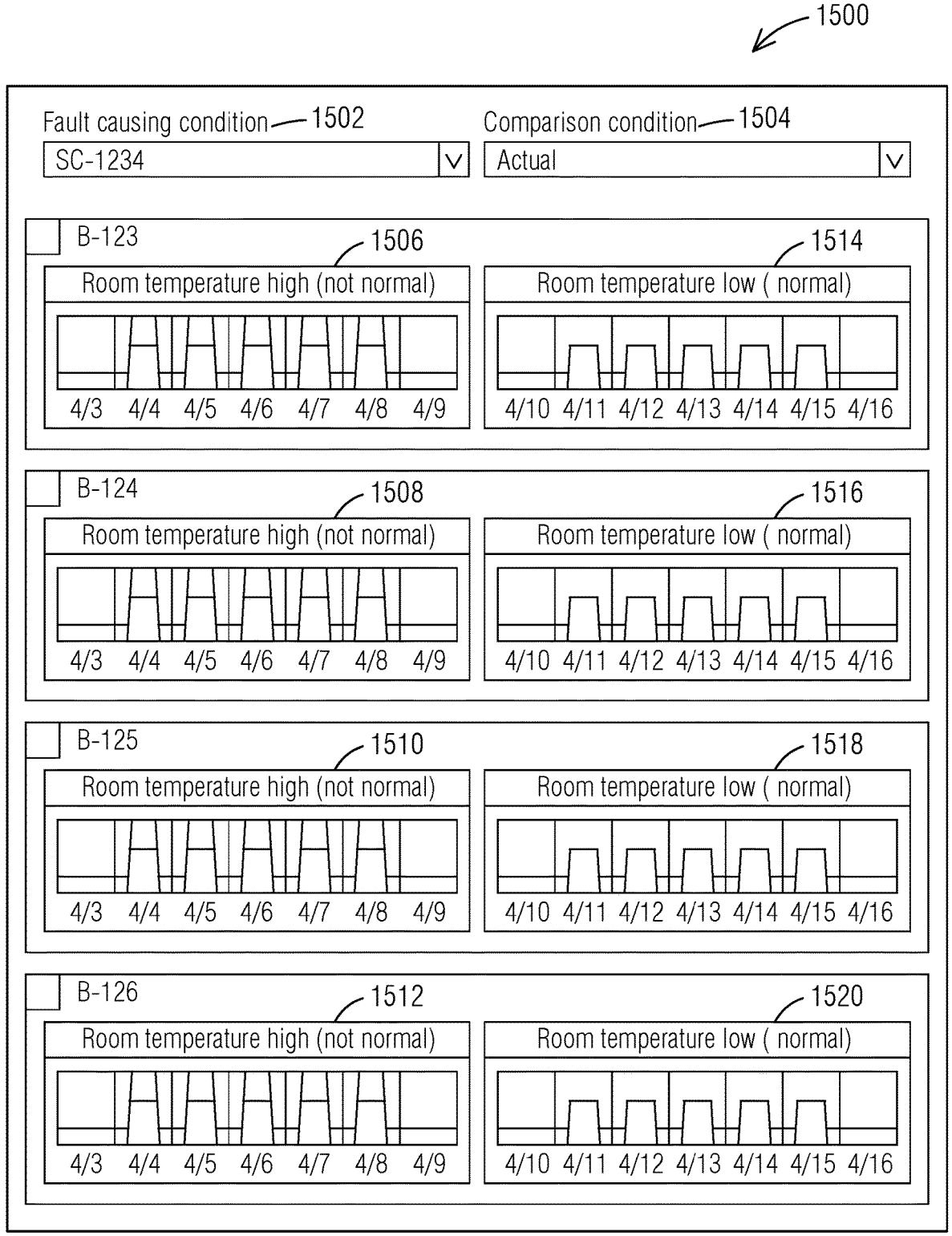
FIG. 15 is a front planar view depicting effectiveness of action information of an example implementation of the user interface of FIGS. 10A and 10B.

Referring to FIG. 15, there is shown a screen view depicting effectiveness of action information 1500 of the user interface. For some embodiments, the effectiveness of action information 1500 may allow for selection of a fault causing condition 1502 and/or a comparison condition 1504 automatically by the system 100 or manually by a user. For example, the fault causing condition 1502 may be a control that has selected the cause identifier, which corresponds to the supplemental information 1004 of FIG. 10A. Also, the comparison condition 1504 may be associated with an "actual" selection, which corresponds to a current situation. In addition, one or more assets of FIG. 15 may be similar to the assets shown by the fault information of FIG. 11 and/or causal chain information of FIG. 12 for comparison. The effectiveness of action information 1500 includes one or more actions executed or monitored by the system 100, in which a comparison of a property of the facility, or a portion thereof, before 1506-1512 and after 1514-1520 the action is provided. Based on this information the system 100 and/or a facility manager may determine future strategies or approaches for managing the facility. For example, the system 100 or the facility manager may determine whether the selected and initiated responsive action was effective, thus indicating that the assets and their states have returned to normal.

Figure 16B:
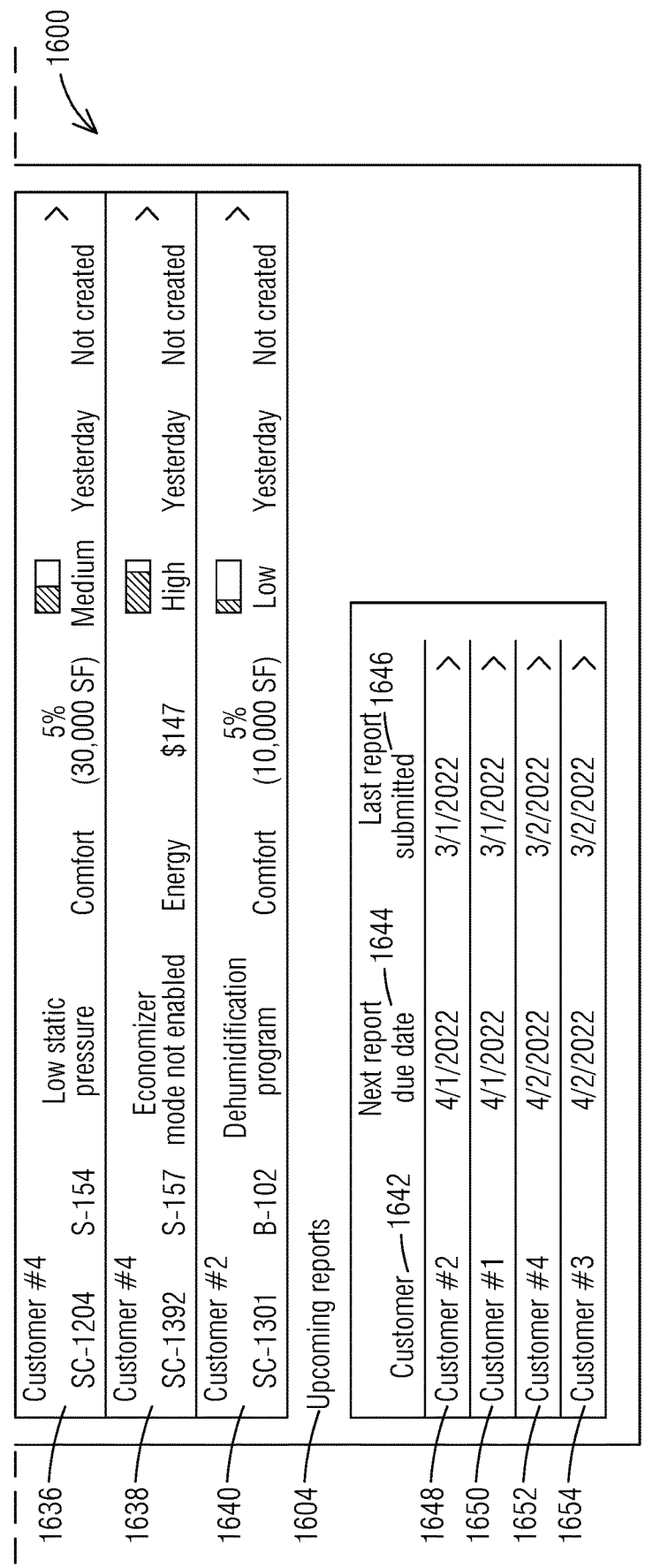

Referring to FIG. 16 (including FIGS. 16A and 16B), there is shown a screen view depicting one or more manager information (such as manager KPIs) of the user interface. It is to be understood that manager information is based on information provided by a facility manager, facility owner, or other entities having an interest in the facility. The manager information includes manager specified information 1602 and, for some embodiments, may also include status information 1604 about upcoming reports. The manager specified information 1602 includes, but is not limited to, manager identification 1606, facility identification 1608, suggested causes 1610, qualitative impact 1612, quantitative impact 1614, criticality 1616, last occurrence 1618, and/or work order status 1620. Examples of categories for suggested causes 1610 include, but are not limited to, power, equipment mode, damper, chiller, pump, fan, temperature, pressure, economizer mode, dehumidification, and/or control issue. The qualitative impact 1612 and the quantitative impact 1614 may reflect the manager information 416, such as customer's KPIs, described above in reference to FIG. 4. Examples of categories for qualitative impact 1612 include, but are not limited to, productivity, energy, and/or comfort. Examples of value thresholds for quantitative impact 1614 include, but are not limited to, dollar value, percentage, area (such as square footage), and the like. Examples of categories for criticality 1616 include, but are not limited to, low, medium, high, and/or critical. For some embodiments, the last occurrence 1618 may be presented in the form of a date, a relative time designation, or both. For some embodiments, the work order status 1620 may be presented in the form of whether a work order has been created or has not been created and/or a date of creation. The manager information also includes a line item 1622-1640 for each suggested cause or work order, each identified by a suggested cause number or a work order number, in which a single manager may be associated with one or more suggested causes or one or more work orders.

As stated above, the manager information may include status information 1606 about upcoming reports. The status information 1604 includes a manager identification 1642 (similar to the manager identification 1606 of the manager specified information 1602) as well as a next report date 1644, a last report date 1646, or both. The status information 1604 may be provided for one or more managers, similar to the manager specified information 1602.

Those skilled in the art will recognize that, for simplicity and clarity, the full structure and operation of all data processing systems suitable for use with the present disclosure are not being depicted or described herein. Also, none of the various features or processes described herein should be considered essential to any or all embodiments, except as described herein. Various features may be omitted or duplicated in various embodiments. Various processes described may be omitted, repeated, performed sequentially, concurrently, or in a different order. Various features and processes described herein can be combined in still other embodiments as may be described in the claims.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an example embodiment of the present disclosure has been described in detail, those skilled in the art will understand that various changes, substitutions, variations, and improvements disclosed herein may be made without departing from the spirit and scope of the disclosure in its broadest form.

What is claimed is:

1. A building automation system for managing causal chain comprising:
    an input component collecting facility data of the building automation system;
    a processor generating at least one causal chain based on the facility data, the processor further identifies at least one suggested cause of the at least one causal chain and determines at least one responsive action associated with a root cause based on the at least one causal chain and a cause-action mapping, the at least one suggested cause corresponding, wherein the at least one causal chain including a causal factor r associated with a root cause, causal factor 0 and causal factor 1 preceding the causal factor r, and causal factor r+f subsequent to the causal factor r, the causal factor 0 being associated with a pre-trigger operating condition, the causal factor 1 being associated with a trigger condition, and the causal factor r+f associated with a fault subsequent to the trigger, wherein each of the causal factor 0, the causal factor 1, the causal factor r, and the causal factor r+f is correlated with a corresponding event and the at least one suggested cause corresponds to the causal factor r associated with the root cause, wherein the processor identifies the at least one suggested cause by grouping faults per asset based on asset information, data point values, analytic results, and asset topology of the facility data; identifying at least one causal chain based on the faults per asset, the asset topology, and rule topology of the facility data; and identifying the at least one suggested cause based on the at least one causal chain and the rule topology, and wherein the at least one responsive action associated with the root cause and the building automation system establishing a trace between the root cause and the responsive actions; and an output component generates a work order corresponding to one or more suggested responsive actions associated with the root cause of the at least one causal chain, the output component further tracking one or more causal factors of the at least one causal chain based on the trace between the root cause and the responsive actions.

2. The building automation system as described in claim 1, wherein the facility data includes at least one of asset information, data point values, analytic results, asset topology, or rule topology.

3. The building automation system as described in claim 1, wherein the at least one suggested cause best matches the rule topology.

4. The building automation system as described in claim 1, wherein each suggested cause includes a cause confidence level per causal chain reflecting a quality of matching the at least one suggested cause to the rule topology.

5. The building automation system as described in claim 1, wherein the processor determines the at least one responsive action by:

selecting at least one selected cause of the at least one suggested cause based on the at least one causal chain and the cause-action mapping; and selecting the at least one responsive action based on the at least one selected cause.

6. The building automation system as described in claim 5, wherein each selected cause being selected has a higher confidence level than any non-selected causes per causal chain.

7. The building automation system as described in claim 5, wherein the processor selects the at least one responsive action by:

selecting the at least one responsive action based on a comparison of causes to responsive actions; and determining an action confidence level for each responsive action based on a quality of matching the causes to the responsive actions, wherein the quality is a measurable quality based on knowledge whether the responsive action would resolve a failure.

8. The building automation system as described in claim 1, wherein the output component provides a particular causal chain of the at least one causal chain by:

determining a responsive action cost based on the at least one responsive action, asset information, and data point values;

ranking the at least one selected responsive action of the at least one responsive action based on the manager information and rate-cost information; and providing the particular causal chain to an output component based on the at least one selected responsive action as ranked.

9. The building automation system as described in claim 8, wherein:

the responsive action cost includes a labor or material cost and a responsive action impact related to the responsive action;

the responsive action impact includes at least one of an energy cost or a sustainability value; and the at least one selected responsive action is weighted based on the manager information and the rate-cost information.

10. The building automation system as described in claim 8, wherein:

the output component includes a display for providing the particular causal chain with at least one of a menu, location, faults, causal chain, suggested cause, suggested action, or effectiveness of action; and the particular causal chain includes causal factors associated with asset information.

11. The building automation system as described in claim 8, wherein the processor includes a machine learning module to perform at least one of learning automatically causal chain patterns or assist with a rule-based module of the processor.

12. The building automation system as described in claim 1, wherein the at least one causal chain includes an additional causal factor between the causal factor 1 and the causal factor r or between the causal factor r and the causal factor r+f.

13. A method of a building automation system for managing causal chain, the method comprising:

collecting facility data of the building automation system;

generating at least one causal chain based on the facility data, the at least one causal chain including a causal factor r associated with a root cause, causal factor 0 and causal factor 1 preceding the causal factor r, and causal factor r+f subsequent to the causal factor r, the causal factor 0 being associated with a pre-trigger operating condition, the causal factor 1 being associated with a trigger condition, and the causal factor r+f associated with a fault subsequent to the trigger, wherein each of the causal factor 0, the causal factor 1, the causal factor r, and the causal factor r+f is correlated with a corresponding event;

identifying at least one suggested cause of the at least one causal chain, the at least one suggested cause corresponding to the causal factor r associated with the root cause, identifying the at least one suggested cause comprising:

grouping faults per asset based on asset information, data point values, analytic results, and asset topology of the facility data;

identifying the at least one causal chain based on the faults per asset, the asset topology, and rule topology of the facility data; and identifying the at least one suggested cause based on the at least one causal chain and the rule topology;

determining at least one responsive action associated with the root cause based on the at least one causal chain and a cause-action mapping, the at least one responsive action associated with the root cause and the building automation system establishing a trace between the root cause and the responsive actions; and generating a work order corresponding to one or more suggested responsive actions associated with the root cause of the at least one causal chain, wherein generating the work order includes tracking one or more causal factors of the at least one causal chain based on the trace between the root cause and the responsive actions.

14. The method as described in claim 13, wherein the facility data includes at least one of asset information, data point values, analytic results, asset topology, or rule topology.

15. The method as described in claim 13, wherein the at least one suggested cause best matches the rule topology.

16. The method as described in claim 13, wherein each suggested cause includes a cause confidence level per causal chain reflecting a quality of matching the at least one suggested cause to the rule topology.

17. The method as described in claim 13, wherein determining the at least one responsive action comprises:

selecting at least one selected cause of the at least one suggested cause based on the at least one causal chain and the cause-action mapping; and selecting the at least one responsive action based on the at least one selected cause.

18. The method as described in claim 17, wherein each selected cause being selected has a higher confidence level than any non-selected causes per causal chain.

19. The method as described in claim 17, wherein selecting the at least one responsive action comprises:

selecting the at least one responsive action based on a comparison of causes to responsive actions; and determining an action confidence level for each responsive action based on a quality of matching the causes to the responsive actions, wherein the quality is a measurable quality based on knowledge whether the responsive action would resolve a failure.

20. The method as described in claim 13, further comprising providing a particular causal chain of the at least one causal chain comprising:

determining a responsive action cost based on the at least one responsive action, asset information, and data point values;

ranking the at least one selected responsive action of the at least one responsive action based on the manager information and rate-cost information; and providing the particular causal chain to an output component based on the at least one selected responsive action as ranked.

21. The method as described in claim 20, wherein:

the responsive action cost includes a labor or material cost and a responsive action impact related to the responsive action;

the responsive action impact includes at least one of an energy cost or a sustainability value; and the at least one selected responsive action is weighted based on the manager information and the rate-cost information.

22. The method as described in claim 13, wherein providing the particular causal chain includes displaying the particular causal chain with at least one of a menu, location, causal chain, faults, suggested cause, suggested action, or effectiveness of action, the particular causal chain including causal factors associated with asset information.

23. The method as described in claim 13, wherein a least one of generating the at least one suggested cause, generating the at least one causal chain, or determining the at least one responsive action includes performing via a machine learning at least one of learning automatically causal chain patterns or assisting with a rule-based module.

24. The method as described in claim 13, wherein the at least one causal chain includes an additional causal factor between the causal factor 1 and the causal factor r or between the causal factor r and the caudal factor r+f.

* * * * *